United States Patent
Lee et al.

(10) Patent No.: US 12,099,333 B2
(45) Date of Patent: Sep. 24, 2024

(54) ELECTRONIC DEVICE FOR BRAIN-INSPIRED ADAPTIVE CONTROL OF RESOLVING BIAS-VARIANCE TRADEOFF, AND METHOD THEREOF

(71) Applicant: Korea Advanced Institute of Science and Technology, Daejeon (KR)

(72) Inventors: Sang Wan Lee, Daejeon (KR); Dongjae Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 229 days.

(21) Appl. No.: 17/572,606

(22) Filed: Jan. 10, 2022

(65) Prior Publication Data

US 2022/0299948 A1     Sep. 22, 2022

(30) Foreign Application Priority Data

Mar. 18, 2021   (KR) .......................... 10-2021-0035103

(51) Int. Cl.
G05B 13/02     (2006.01)

(52) U.S. Cl.
CPC ....... *G05B 13/0265* (2013.01); *G05B 13/024* (2013.01); *G05B 13/026* (2013.01)

(58) Field of Classification Search
CPC ................... G05B 13/026; G05B 13/0265
USPC ........................................................ 700/28
See application file for complete search history.

(56) References Cited

U.S. PATENT DOCUMENTS

| | | | |
|---|---|---|---|
| 2018/0040160 A1* | 2/2018 | Moon | G06T 15/06 |
| 2020/0118017 A1 | 4/2020 | Li | |
| 2022/0207331 A1* | 6/2022 | Andoche | G06Q 30/0282 |

OTHER PUBLICATIONS

Glascher (States versus Rewards: Dissociable Neural Prediction Error Signals Underlying Model-Based and Model-Free Reinforcement Learning, Neuron 66, 585-595, May 27, 2010 a2010 Elsevier Inc.) (Year: 2010).*
Nagabandi (Neural Network Dynamics for Model-Based Deep Reinforcement Learning with Model-Free Fine-Tuning, 2018 IEEE International Conference on Robotics and Automation (ICRA) May 21-25, 2018 (Year: 2018).*
Neal (A Modern Take on the Bias-Variance Tradeoff in Neural Networks, arXiv:1810.08591v4 [cs.LG] Dec. 18, 2019) (Year: 2019).*
Dongjae Kim et al., 'Prefrontal solution to the bias-variance tradeoff during reinforcement learning', bioRxiv, Dec. 24, 2020, pp. 3-5, 11; fig. 1, 3, https://www.biorxiv.org/content/10.1101/2020.12.23.424258v1.

(Continued)

*Primary Examiner* — Jigneshkumar C Patel
(74) *Attorney, Agent, or Firm* — BKRIP LLC

(57) ABSTRACT

Various embodiments relate to an electronic device for brain-inspired adaptive control of resolving the bias-variance tradeoff and a method thereof. The method may include estimating a prediction error baseline for an environment, based on a first prediction error of a low-variance intelligent system for the environment and a second prediction error of a low-bias intelligent system for the environment; and implementing an adaptive control system by combining the low-variance intelligent system and the low-bias intelligent system based on the estimated prediction error baseline.

14 Claims, 10 Drawing Sheets

(56) References Cited

OTHER PUBLICATIONS

Richard Cheng et al., 'Control Regularization for Reduced Variance Reinforcement Learning', arXiv:1905.05380v1, May 2019, pp. 1, 4, https://arxiv.org/pdf/1905.05380v1.pdf.

Jose Blanchet et al., 'Time-Series Imputation with Wasserstein Interpolation for Optimal Look-Ahead-Bias and 3 Variance Tradeoff', arXiv:2102.12736v1, Feb. 2021, pp. 1,5; fig. 2, https://arxiv.org/pdf/2102.12736v1.pdf.

Ali Mahmoudzadeh et al., 'Bias Variance Tradeoff in Analysis of Online Controlled Experiments', arXiv:2009.05015v1, Sep. 2020, section 3, https://arxiv.org/ftp/arxiv/papers/2009/2009.05015v1.pdf.

* cited by examiner (a)

(b)

(a)

(b)

ELECTRONIC DEVICE FOR BRAIN-INSPIRED ADAPTIVE CONTROL OF RESOLVING BIAS-VARIANCE TRADEOFF, AND METHOD THEREOF

CROSS-REFERENCES TO RELATED APPLICATION

This application is based on and claims priority under 35 U.S.C. 119 to Korean Patent Application No. 10-2021-0035103, filed on Mar. 18, 2021 in the Korean intellectual property office, the disclosure of which is herein incorporated by reference in its entirety.

TECHNICAL FIELD

Various embodiments relate to an electronic device for brain-inspired adaptive control of resolving the bias-variance tradeoff and a method thereof.

BACKGROUND OF THE INVENTION

The bias-variance tradeoff is one of the most fundamental issues in the design of engineering control and learning systems that has not been solved yet. Intelligent systems of high complexity are advantageous in resolving specific problem situations (low bias error), but show performance deterioration even with a slight change in environment (high variance error). Meanwhile, intelligent systems of low complexity show little difference in performance caused by a change in environment (low variance error) but overall low performance (high bias error).

To develop an optimal intelligent system, the existing mainstream methodology eclectically selected a second-worst system that produces the minimum sum of bias error and variance error as an optimal system. However, this eclectic methodology cannot cope quickly with actual environmental context changes and therefore may arouse concern about performance deterioration. On the other hand, humans tend to show a learning pattern in which they adapt quickly to context changes.

SUMMARY

Various embodiments are directed to deriving a novel adaptive control system from a brain's computational mechanism which always maintains a low error value, through appropriate flexible control between an intelligent system with low bias error and an intelligent system with low variance error.

Various embodiments provide an electronic device for brain-inspired adaptive control of resolving the bias-variance tradeoff and a method thereof.

According to various embodiments, there is provided a method of an electronic device, the method including: estimating a prediction error baseline for an environment, based on a first prediction error of a low-variance intelligent system for the environment and a second prediction error of a low-bias intelligent system for the environment; and implementing an adaptive control system by combining the low-variance intelligent system and the low-bias intelligent system based on the estimated prediction error baseline.

According to various embodiments, there is provided an electronic device including: a memory; and a processor connected to the memory and configured to execute at least one instruction stored in the memory, wherein the processor may be configured to estimate a prediction error baseline for an environment, based on a first prediction error of a low-variance intelligent system for the environment and a second prediction error of a low-bias intelligent system for the environment, and implement an adaptive control system by combining the low-variance intelligent system and the low-bias intelligent system based on the estimated prediction error baseline.

According to various embodiments, there is provided a non-transitory computer-readable storage medium for storing one or more programs to execute a method, the method including: estimating a prediction error baseline for an environment, based on a first prediction error of a low-variance intelligent system for the environment and a second prediction error of a low-bias intelligent system for the environment; and implementing an adaptive control system by combining the low-variance intelligent system and the low-bias intelligent system based on the estimated prediction error baseline.

According to various embodiments, an electronic device may implement a brain-inspired adaptive control of resolving the bias-variance tradeoff. That is, the electronic device may combine a low variance intelligent system (referring to an intelligent control or learning system that makes low variance error) and a low bias intelligent system (referring to an intelligent control or learning system that makes low bias error) in a flexible manner, based on a prediction error baseline for an environment, and therefore resolve the bias-variance tradeoff through the characteristics of a natural intelligent system based on human brain. In this instance, the electronic device may track total prediction error and maintain low prediction error by updating the prediction error baseline in response to changes in environment. Accordingly, the adaptive control system may have both low variance error and low bias error and at the same time maintain low prediction error.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
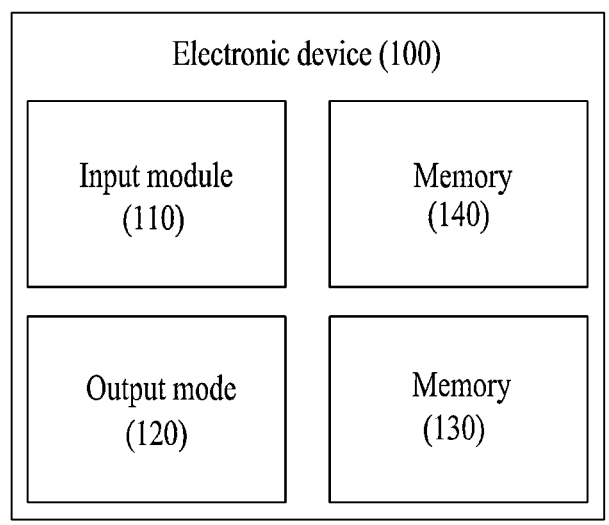
FIG. 1 is a diagram illustrating an electronic device according to various embodiments.

Hereinafter, various embodiments of the present disclosure will be described with reference to the drawings.

The development of an intelligent system for solving a problem situation inevitably creates a bias-variance tradeoff. An intelligent system with high complexity overfits a problem situation it experiences in a learning process and does not function properly even with a slight change in environment and suffers from a marked deterioration in performance (low bias error and high variance error). On the contrary, an intelligent system with low complexity has low performance (underfits) due to insufficient learning but has flexibility that allows for coping with slight changes (high bias error and low variance error). A general method used to select an optimal intelligent system despite this bias-variance tradeoff is to use an intelligent system with low total error (the sum of bias error and variance error), that is, an appropriate level of complexity. However, this is merely an eclectic alternative and still has high error, and therefore cannot be seen as a solution to the bias-variance tradeoff. Moreover, this system will have much higher error especially if the environment changes vastly and in various ways.

To solve this problem, it is necessary to develop an intelligent system that (1) minimizes total error despite various changes in environment, and (2) always maintains low error through appropriate and effective adaptive control between a system with low variance error and a system with low bias error.

In order to minimize total error despite various changes in environment, the intelligent system has to properly deal with an error distribution that varies with changes in environment. Environment changes on a smaller level make no major change in that distribution and therefore can be dealt with by using an intelligent system with an appropriately low complexity. However, an environment change that makes a completely different error distribution than the existing one cannot be properly dealt with. In order to cope with this, the system itself has to track errors that vary with environment changes. By tracking varying errors by updating the prediction error baseline, the deviation between an environment error distribution and an error distribution predicted by the intelligent system is reduced, thereby minimizing total error despite a large change in environment.

That is, a number of intelligent systems, rather than a single system, may be employed to flexibly control the intelligent systems in such a way as to have low error according to situations, and natural intelligent systems including humans may cope with environment changes through this flexible control. In particular, two distinctive reinforcement learning algorithms for creatures, that is, model-based and model-free reinforcement learning algorithms, are known to have low bias error and high complexity and low variance error and low complexity, respectively. Accordingly, the bias and variance error may be resolved by reducing total error through proper control between these two reinforcement learning algorithms.

FIG. 1 is a diagram illustrating an electronic device 100 according to various embodiments. FIGS. 2, 3, 4, and 5 are diagrams for explaining characteristics of the electronic device 100 according to various embodiments.

Referring to FIG. 1, the electronic device 100 according to various embodiments may include at least one of an input module 110, an output module 120, a memory 130, and a processor 140. In some embodiments, at least one of the components of the electronic device 100 may be omitted, and at least one component may be added. In some embodiments, at least two of the components of the electronic device 100 may be implemented as one integrated circuit.

The input module 110 may input a signal for use in at least one component of the electronic device 100. The input module 110 may include at least one of an input device configured for a user to directly input a signal into the electronic device 100, a sensor device configured to detect a change in surroundings and generate a signal, and a receiving device configured to receive a signal from external equipment. For example, the sensor device may include an inertial measurement unit (IMU). The inertial measurement unit includes a gyroscope, an accelerometer, and an earth magnetic field sensor, and the accelerometer may detect roll, yaw, and pitch. For example, the input device may include at least one of a microphone, a mouse, and a keyboard. In some embodiments, the input device may include at least one of touch circuitry configured to detect touch and sensor circuitry configured to measure the strength of a force generated by touch.

The output module 120 may output information out of the electronic device 100. The output module 120 may include at least one of a display device configured to visually output information, an audio output device for outputting information as an audio signal, and a transmission device for wirelessly transmitting information. For example, the display device may include at least one of a display, a hologram device, and a projector. For example, the display device may be assembled to at least one of touch circuitry and sensor circuitry and implemented as a touchscreen. For example, the audio output device may include at least one of a speaker and a receiver.

According to one embodiment, the receiving device and the transmission device may be implemented as a communication module. The communication module may communicate with external equipment in the electronic device 100. The communication module may establish a communication channel between the electronic device 100 and external equipment, and may communicate with the external equipment via the communication channel. Here, the external equipment may include at least one of a vehicle, a satellite, a base station, a server, and other electronic devices. The communication module may include at least one of a wired communication module and a wireless communication module. The wired communication module may be connected with wires to the external equipment and communicate with it via wires. The wired communication module may include at least one of a short-range communication module and a long-range communication module. The short-range communication module may communicate with the external equipment through short-range communication. The short-range communication may include at least one, Bluetooth, WiFi direct, and infrared data association (IrDA). The long-range communication module may communicate with the external equipment through long-range communication. The long-range communication may communicate with the external equipment through a network. For example, the network may include at least one of a cellular network, the internet, and computer networks such as LAN (local area network) and WAN (wide area network).

The memory 130 may store various data used by at least one component of the electronic device 100. For example, the memory 130 may include at least one of volatile memory and nonvolatile memory. The data may include at least one program and input data or output data related to it. The program may be stored as software including at least one instruction in the memory 130, and may include at least one among an operating system, a middleware, and an application.

The processor 140 may control at least one component of the electronic device 100 by executing the program of the memory 130. Through this, the processor 140 may perform data processing or operation. In this instance, the processor 140 may execute an instruction stored in the memory 130. According to various embodiments, the processor 140 may implement an optimum intelligent system by combining a low-variance intelligent system and a low-bias intelligent system. Here, the low-variance intelligent system may represent an intelligent system with low variance error, and the low-bias intelligent system may represent an intelligent system with low bias error. In this case, the processor 140 may implement an adaptive control system as an optimal intelligent system that maintains low prediction error (PE), by flexibly combining the low-variance intelligent system and the low-bias intelligent system depending on environment changes. Through this, an adaptive control system may be implemented as an intelligent system in which a human brain's information processing process for resolving the bias-variance tradeoff is implanted into a model.

Figure 2:
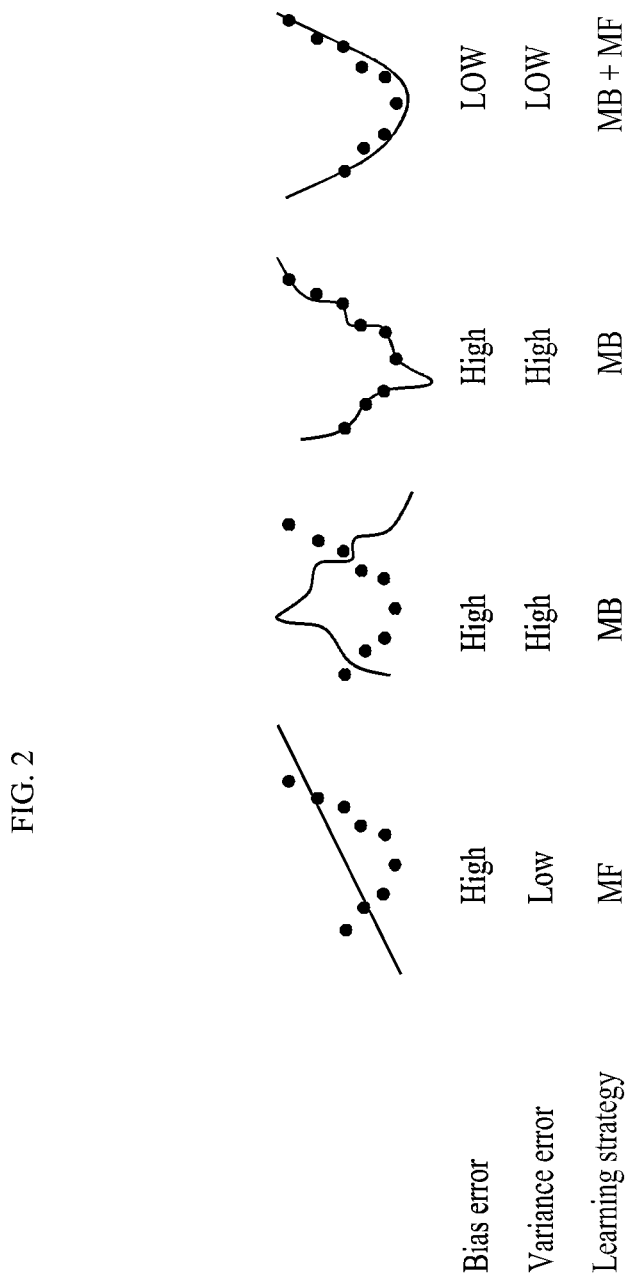
FIGS. 2, 3, 4, and 5 are diagrams for explaining characteristics of the electronic device according to various embodiments.

According to one embodiment, the low-variance intelligent system may include a model-free (MF) reinforcement learning (hereinafter, referred to as MF) algorithm, and the low-bias intelligent system may include a model-based (MB) reinforcement learning (hereinafter, referred to as MB) algorithm. The MF algorithm, the MB algorithm, and a combined (MF+MB) algorithm of the MF algorithm and the MB algorithm according to various embodiments may have the characteristics as shown in FIG. 2. That is, the MF algorithm may have high bias error and low variance error, and the MB algorithm may have high bias error or low bias error and high variance error. In contrast, according to various embodiments, the combined (MF+MB) algorithm may have low bias error and low variance error.

Figure 3:
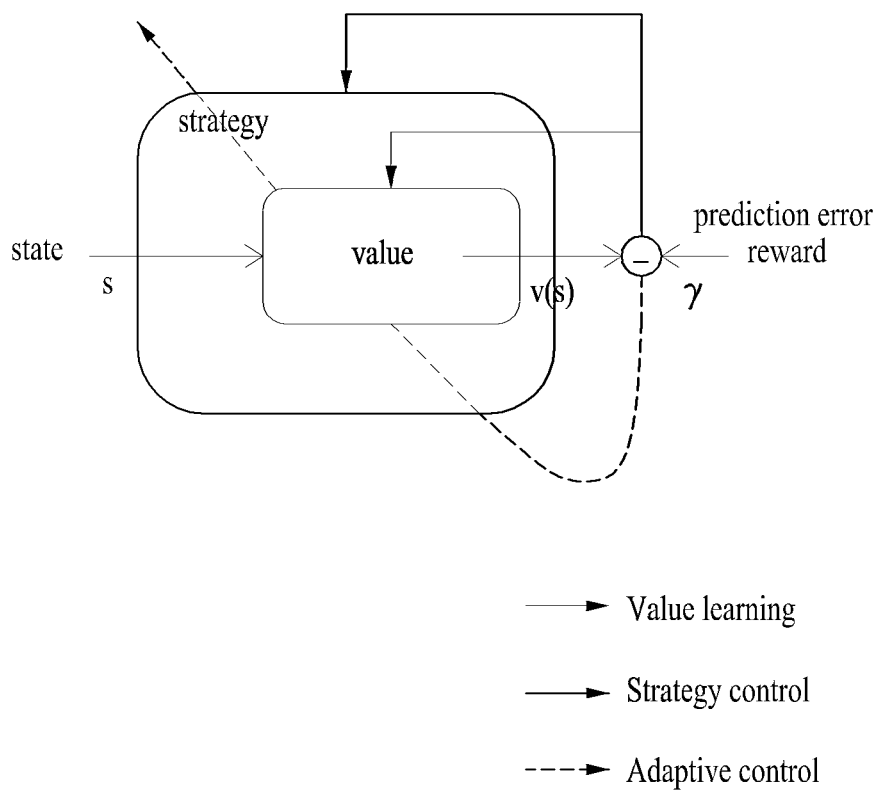

To this end, the processor 140 may estimate a prediction error baseline (PE baseline) for an environment, based on a first prediction error of the low-variance intelligent system for the environment and a second prediction error of the low-bias intelligent system for the environment. Here, the prediction error baseline may vary in a dynamic environment, that is, in response to environment changes, and accordingly, the processor 140 may update the prediction error baseline according to the environment changes. At this point, the prediction error baseline may represent a minimum value within a prediction error range which is achieved by the combination of the low-variance intelligent system and the low-bias intelligent system. According to one embodiment, the first prediction error may be a reward prediction error (PRE), and the second prediction error may be a state prediction error (SPE). Here, as shown in FIG. 3, the processor 140 may estimate prediction error for the environment through value learning based on the first prediction error and the second prediction error, and may estimate a prediction error baseline for minimizing prediction error through strategy control.

Also, the processor 140 may implement an adaptive control system by combining the low-variance intelligent system and the low-bias intelligent system, based on the prediction error baseline. In this case, the processor 140 may control the combination ratio of the low-variance intelligent system and the low-bias intelligent system, based on the prediction error baseline. Here, as illustrated in FIG. 3, the processor 140 may determine the combination ratio of the low-variance intelligent system and the low-bias intelligent system through adaptive control to achieve the prediction error baseline, and may combine the low-variance intelligent system and the low-bias intelligent system according to the combination ratio. Through this, an adaptive control system may be implemented as an optimal intelligent system adaptive to the environment. Accordingly, the adaptive control system may have both low variance error and low bias error and at the same time maintain low prediction error.

Figure 4:
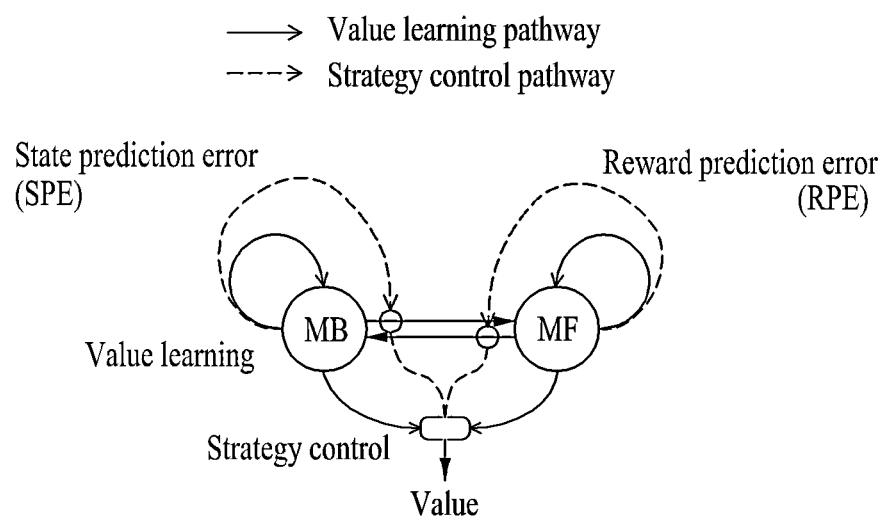
Figure 5:
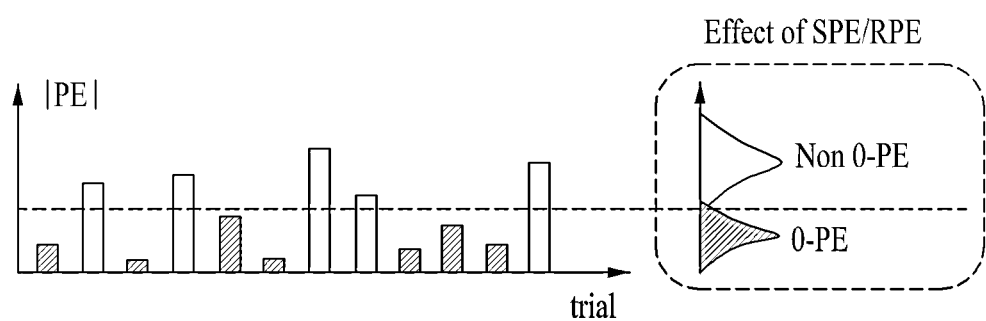
Figure 5:
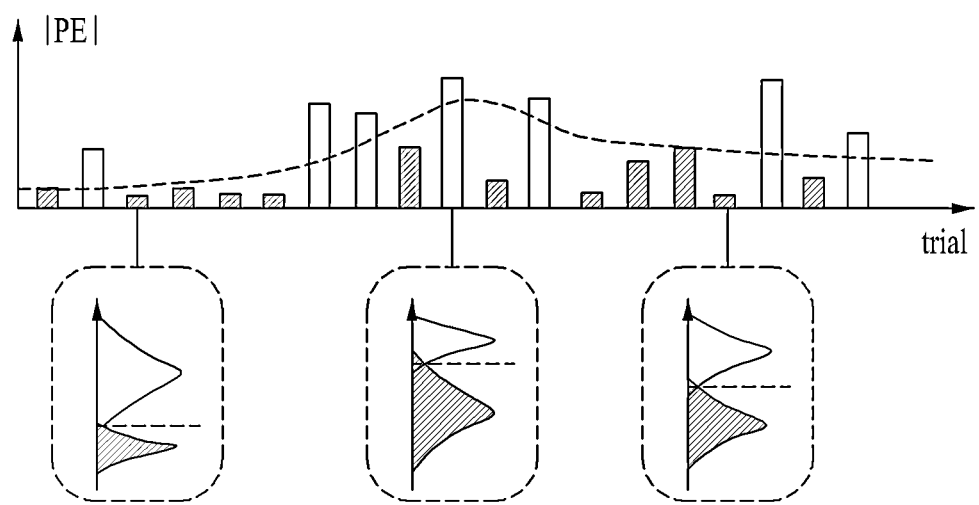

According to one embodiment, the processor 140 may implement an adaptive control system by combining a model-free (MF) reinforcement learning algorithm and a model-based (MB) reinforcement learning algorithm. In this instance, as shown in FIG. 4, the processor 140 may estimate prediction error for the environment through value learning based on the reward prediction error in the model-free (MF) reinforcement learning algorithm and the state prediction error (SPE) in the model-based (MB) reinforcement learning algorithm, and may estimate the prediction error baseline for minimizing the prediction error through strategy control. Also, as shown in FIG. 5, the processor 140 may determine the combination ratio of the model-free (MF) reinforcement learning algorithm and the model-based (MB) reinforcement learning algorithm to achieve the prediction error base line, and may combine the model-free (MF) reinforcement learning algorithm and the model-based (MB) reinforcement learning algorithm according to the combination ratio. Here, as shown in (a) of FIG. 5, if the prediction error baseline is used fixedly for environment changes (fixed PE baseline), the combination ratio of the model-free (MF) reinforcement learning algorithm and the model-based (MB) reinforcement learning algorithm may be maintained despite the environment changes. In contrast, as shown in (b) of FIG. 5, if the prediction error baseline is used variably for environment changes (variable PE baseline), the combination ratio of the model-free (MF) reinforcement learning algorithm and the model-based (MB) reinforcement learning algorithm may be variable with the environment changes. That is, as illustrated in (b) of FIG. 5, the processor 140 may adaptively determine the combination ratio of the model-free (MF) reinforcement learning algorithm and the model-based (MB) reinforcement learning algorithm through adaptive control to achieve a variable prediction error baseline. Through this, an adaptive control system may be implemented as an optimal intelligent system adaptive to the environment.

Figure 6:
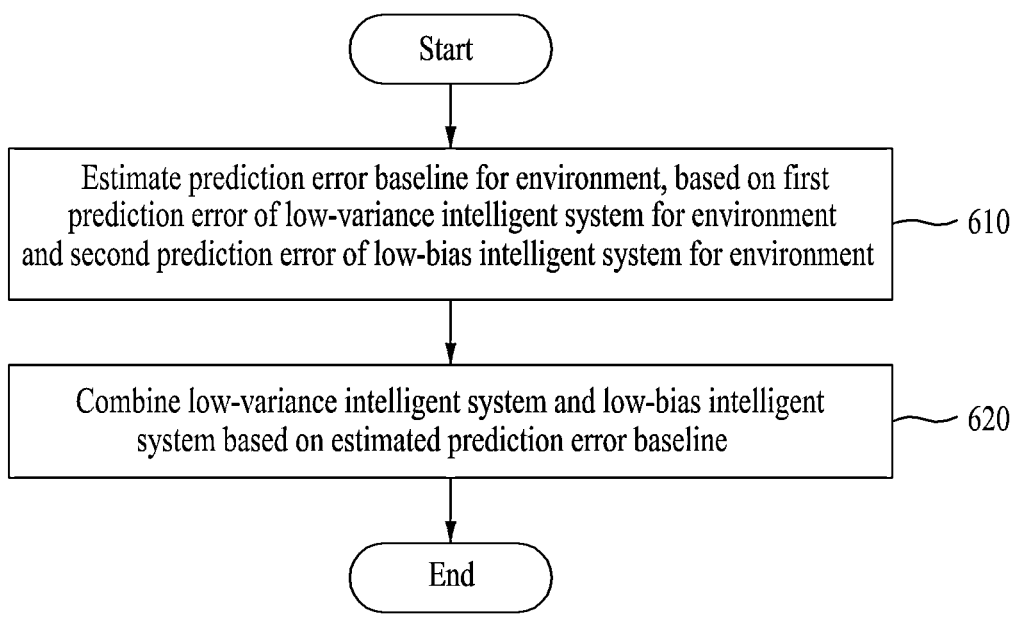
FIG. 6 is a diagram illustrating a method of an electronic device according to various embodiments.

FIG. 6 is a diagram illustrating a method of an electronic device according to various embodiments.

Referring to FIG. 6, in the step 610, the electronic device 100 may estimate a prediction error baseline for an environment, based on a first prediction error of the low-variance intelligent system for the environment and a second prediction error of the low-bias intelligent system for the environment. At this point, the prediction error baseline may represent a minimum value within a prediction error range which is achieved by the combination of the low-variance intelligent system and the low-bias intelligent system. According to one embodiment, the low-variance intelligent system may include a model-free (MF) reinforcement learning algorithm, and the low-bias intelligent system may include a model-based (MB) reinforcement learning algorithm. In this case, the first prediction error may be a reward prediction error (PRE), and the second prediction error may be a state prediction error (SPE). Here, as shown in FIG. 3 or FIG. 4, the processor 140 may estimate prediction error for the environment through value learning based on the first prediction error and the second prediction error, and may estimate a prediction error baseline for minimizing prediction error through strategy control.

Next, in the step 620, the electronic device 100 may combine the low-variance intelligent system and the low-bias intelligent system based on the prediction error baseline. In this case, the processor 140 may control the combination ratio of the low-variance intelligent system and the low-bias intelligent system, based on the prediction error baseline. Through this, an adaptive control system may be implemented as an optimal intelligent system adaptive to the environment. According to one embodiment, the processor 140 may implement an adaptive control system by combining the model-free (MF) reinforcement learning algorithm and the model-based (MB) reinforcement learning algorithm. Here, as illustrated in (b) of FIG. 3 or FIG. 5, the processor 140 determine the combination ratio of the low-variance intelligent system and the low-bias intelligent system through adaptive control to achieve the prediction error baseline, and may combine the low-variance intelligent system and the low-bias intelligent system according to the combination ratio.

According to various embodiments, the electronic device 100 may repeatedly perform the steps 610 and 620. Here, the prediction error baseline may vary in a dynamic environment, that is, in response to environment changes, and accordingly, the processor 140 may update the prediction error baseline according to the environment changes in the step 610. Also, the processor 140 may adaptively determine the combination ratio of the model-free (MF) reinforcement learning algorithm and the model-based (MB) reinforcement learning algorithm through adaptive control to achieve a variable prediction error baseline. Through this, an adaptive control system may be implemented as an optimal intelligent system adaptive to the environment. Accordingly, the adaptive control system may have both low variance error and low bias error and at the same time maintain low prediction error.

Figure 7:
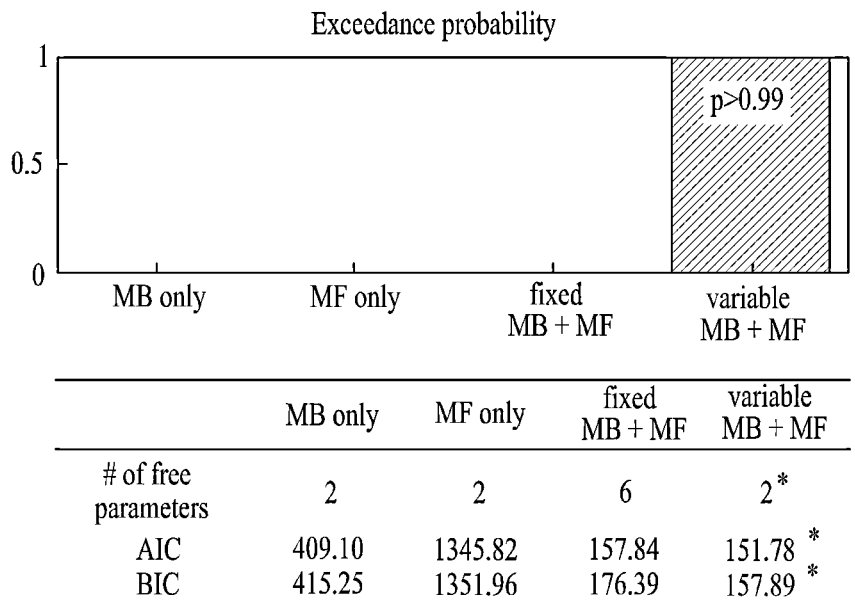
FIGS. 7, 8, 9a, and 9b are diagrams for explaining the performance of the electronic device according to various embodiments.
Figure 7:
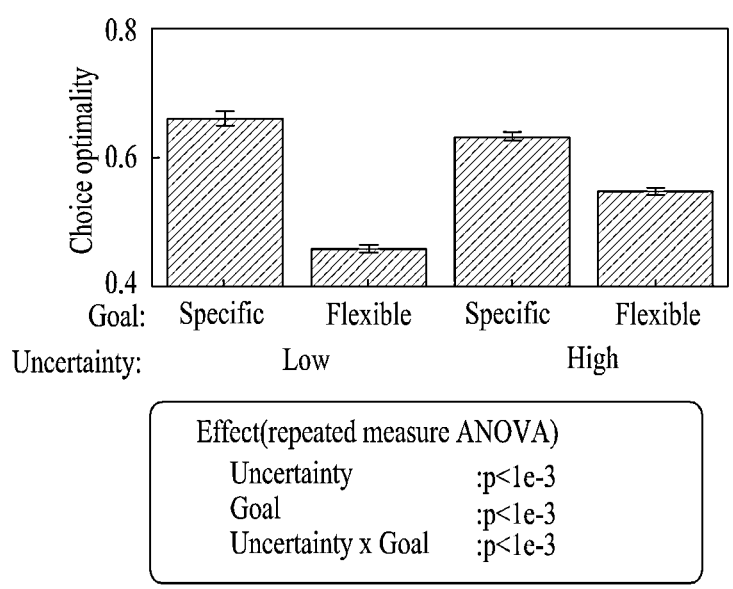
Figure 8:
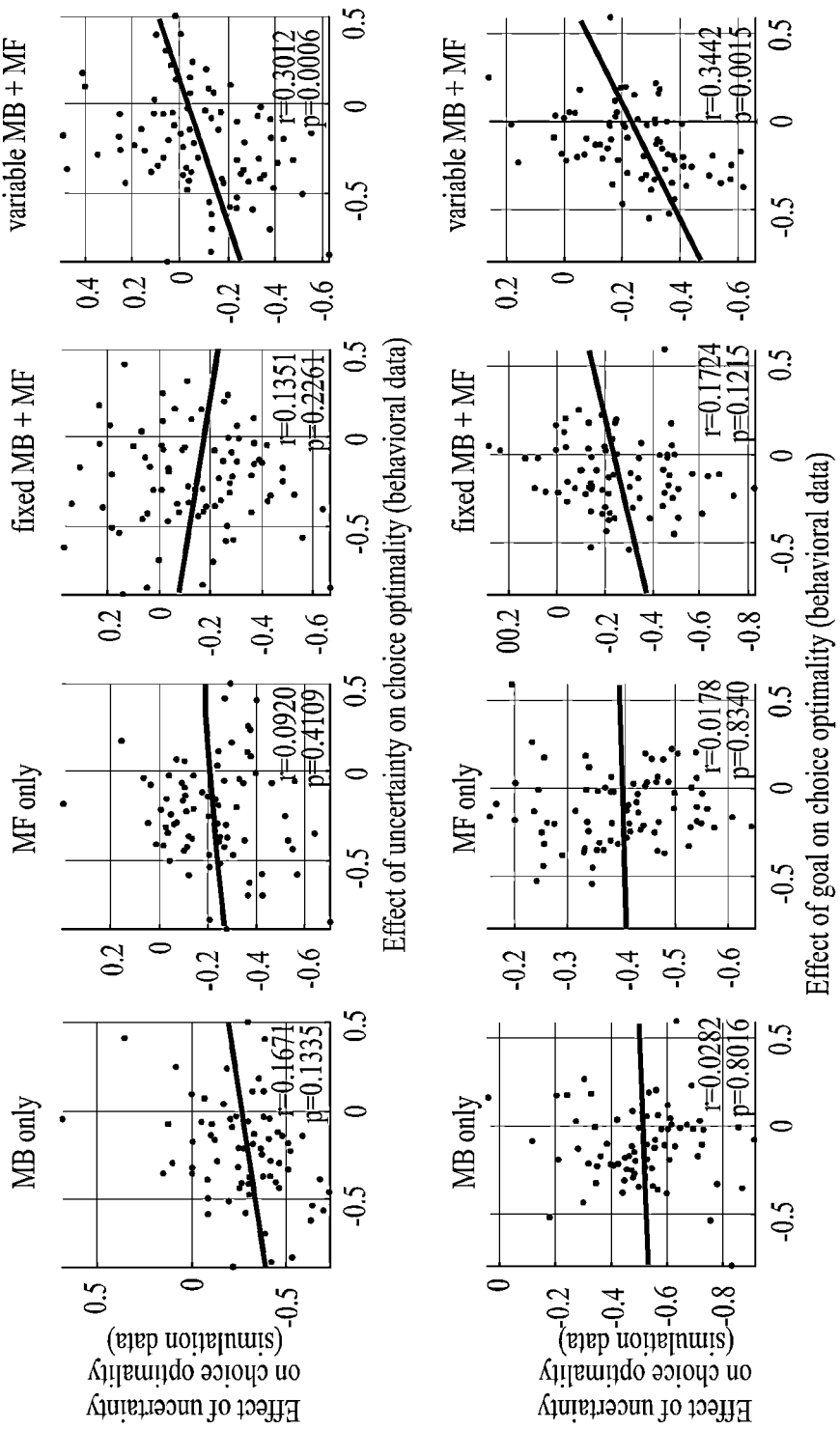

FIGS. 7 and 8 are diagrams for explaining the performance of the electronic device 100 according to various embodiments.

Referring to FIGS. 7 and 8, an adaptive control system based on a variable prediction error baseline has better performance as compared to other adaptive control systems. As illustrated in (a) of FIG. 7, an MB algorithm, an MF algorithm, a fixedly combined (fixed MB+MF) algorithm, and a variable, i.e., adaptively combined (variable MB+MF) algorithm were compared. As a result, only the exceedance probability of the adaptively combined (variable MB+MF) algorithm was larger than 0.99, which suggests that the performance of the adaptively combined (variable MB+MF) algorithm is better than the performance of the other algorithms. Moreover, the fit indices of the adaptively combined (variable MB+MF) algorithm, for example, BIC (Bayesian information criterion) and AIC (Akaike information criterion), were smaller than the fit indices of the other algorithms, which suggests that the performance of the adaptively combined (variable MB+MF) algorithm is better than the performance of the other algorithms. Meanwhile, as shown in (b) of FIG. 7, the effects of environmental context for the selection operation of the adaptively combined (variable MB+MF) algorithm were evaluated. As a result, the adaptively combined (variable MB+MF) algorithm performed an appropriate selection operation on environmental context. Meanwhile, as illustrated in FIG. 8, to examine the overfitting of a problem situation in a learning process, parameter recovery analysis was conducted. At this time, the effects of environmental context for the selection operation of the MB algorithm, the MF algorithm, the fixedly combined (fixed MB+MF) algorithm, and the variably, i.e., adaptively combined (variable MB+MF) algorithm were compared. As a result, the adaptively combined (variable MB+MF) algorithm performed an appropriate selection operation on environmental context, as compared to the other algorithms.

Figure 9A:
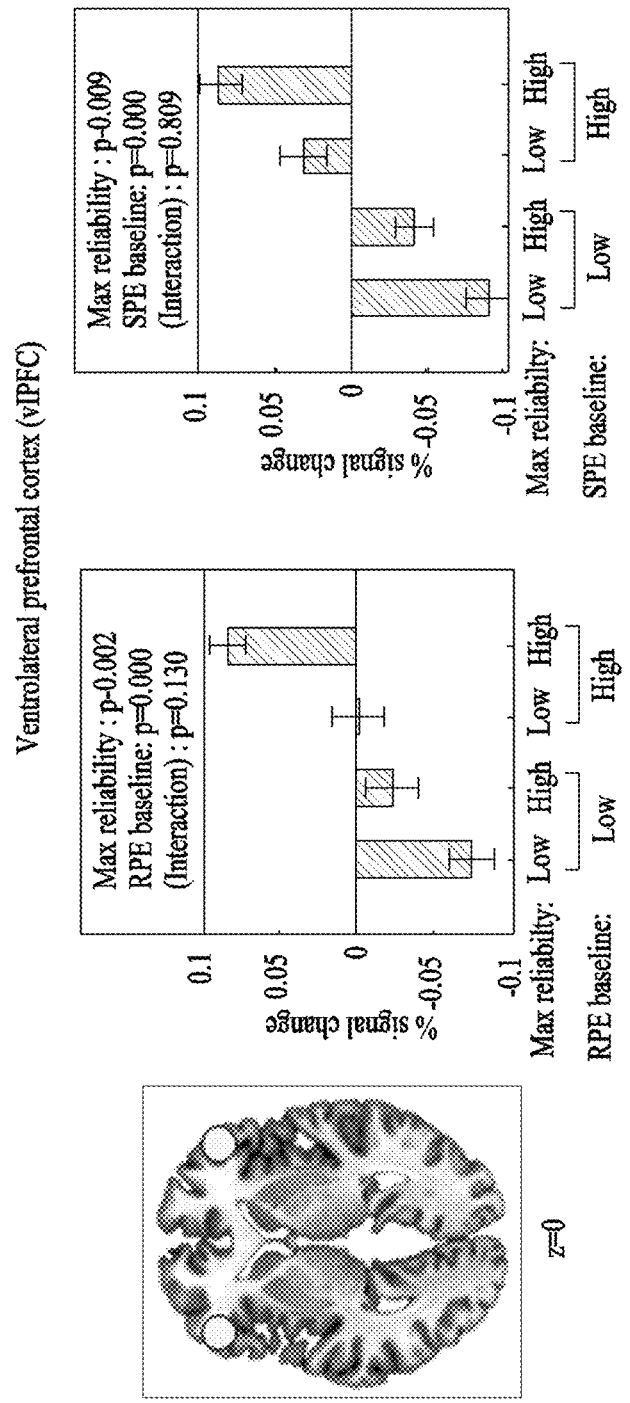
Figure 9B:
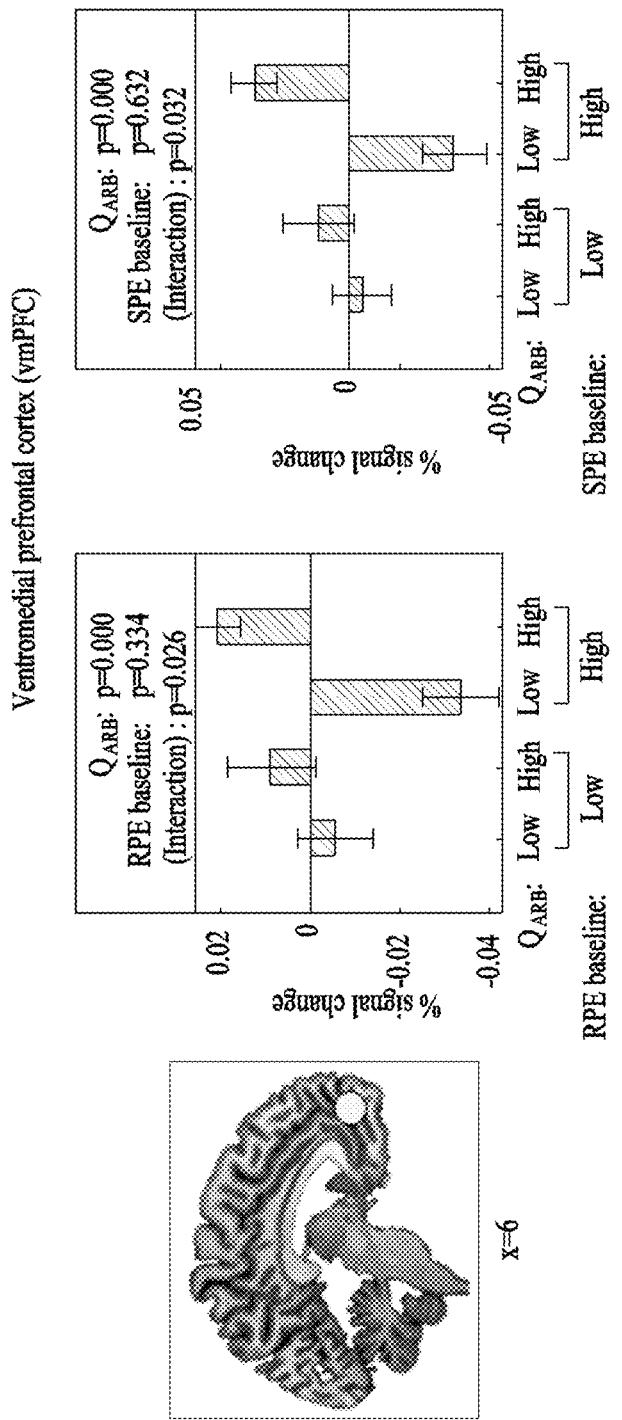

FIGS. 9a and 9b are diagrams for explaining the performance of the electronic device 100 according to various embodiments.

Referring to FIGS. 9a and 9b, the prediction error baseline estimated according to various embodiments reflects a human brain's information processing process for resolving the bias-variance tradeoff. That is, the MB algorithm, the MF algorithm, and the prediction error baseline estimated based on them have very high reliability, compared to the neural activity patterns in the ventrolateral PFC (vlPFC) bilaterally and frontopolar cortex (FPC) in the human brain region. This suggests that brain-inspired adaptive control of resolving the bias-variance tradeoff is possible through appropriate flexible control between an intelligent system with low bias error and an intelligent system with low variance error.

According to various embodiments, the electronic device 100 may implement implement a brain-inspired adaptive control of resolving the bias-variance tradeoff. That is, the electronic device 100 may combine a low variance intelligent system and a low bias intelligent system in a flexible manner, based on a prediction error baseline for an environment, and therefore resolve the bias-variance tradeoff through the characteristics of a natural intelligent system based on human brain. In this instance, the electronic device 100 may track total prediction error and maintain low prediction error by updating the prediction error baseline in response to changes in environment. Accordingly, the adaptive control system may have both low variance error and low bias error and at the same time maintain low prediction error.

Since intelligent systems currently under development are constructed in a conservative manner to reduce the risk of failure and therefore have low complexity, there have been limitations to effective improvements in performance. However, according to various embodiments, the adaptive control system may promote drastic improvement in the performance of the existing intelligent systems because it is capable of resolving the bias-variance tradeoff. Accordingly, the various embodiments may be employed or applied in various fields. For example, these fields may include, but not limited to, control systems using sensors, human-robot/computer interactions, smart IoT (Internet-of-things), expert profiling and smart education, and user target AD.

The first field of application is control systems using sensors. Spearheaded by automobiles, control systems which were controlled through mechanical equipment in the past are recently being replaced by electronic equipment. This computerization process simply imitates a mechanical process, which is not getting incidental gains from the characteristics of computerization. This is because a functional failure or error may cause a large loss. Control using an intelligent system capable of minimizing the bias and variance error may significantly reduce the error, and therefore can be applied in the development of low-cost and high-performance control systems.

The second field of application is human-robot/computer interaction. Every behavior of natural intelligent takes place based on high-level cognitive functions which work out to minimize the bias and variance error. A typical example of this is affective computing, which aims to detect emotions, a type of cognitive state of humans, to assist in human activities according to the situation. According to various embodiments, it is possible to construct a system that can efficiently adapt itself to assist in human activities by predicting environment changes (e.g., awareness and unawareness) similar in context to emotions that can be recognized by computers, as well as simply detecting emotions, thereby assisting humans in achieving excellent outcomes.

The third field of application is smart IoT. Notably, in the IoT field, a variety of devices need to be controlled, and therefore there may be various cognitive functions used to control each device. In this instance, the versatility of various embodiments makes it possible to recognize environment changes in controlling each device and efficiently predict functions that humans intend to use, without overfitting, thereby allowing for assisting humans.

The fourth field of application is expert profiling and smart education. Resolving the bias-variance tradeoff by recognizing environment changes means that optimal learning has been done in a human learning process. Various embodiments may clarify which the human learning process lacks knowledge about, between (1) recognition of environment changes and (2) bias and variance error. As such, various embodiments may be used to construct an education system that builds the work capacity of judges, doctors, financial experts, military commanding officers, etc. who have to make decisions effectively and efficiently. Also, it is possible to perform preliminary profiling to find out which the lack of knowledge about matters most, in order to achieve a customized system for such smart education.

The fifth field of application is user target AD. The current advertisement suggestion technology recommends new advertisements based on humans' past search history. However, this advertisement suggestion technology does not take into full account environmental changes the humans experience in every instance. This contributes to a decline in the performance of a system that suggests advertisements quite irrelevant to the user's interests. Using various embodiments, a more accurate user target advertisement may be provided by constructing a system that suggests advertisements on which the rate (error) of the humans' click is low in an environment they are experiencing.

It was inevitable that intelligent systems, despite their usefulness, were employed in a conservative manner in fields where their functional failures may lead to fatal outcomes. However, the latest market trends are showing that intelligent systems are increasingly introduced into control systems based on artificial intelligence. With these trends, intelligent systems of resolving the bias-variance tradeoff will function as efficient and effective control systems, which are an intermediate between existing conservative control systems (low complexity and low performance and artificial intelligence-based latest control systems (high complexity and high performance). Every intelligent system inevitably experiences the bias-variance tradeoff. In various embodiments, it is possible for these systems to resolve this problem and operate successfully despite the high variability of the environment. Thus, these intelligent systems have lower complexity than the latest intelligent systems developed based on deep learning and higher performance than traditional intelligent systems, and therefore may be adapted to all kinds of businesses and jobs that deal mainly with these intelligent systems.

A method of the electronic device 100 according to various embodiments may include: the step (step 610) of estimating a prediction error baseline for an environment, based on a first prediction error of a low-variance intelligent system for the environment and a second prediction error of a low-bias intelligent system for the environment; and the step (step 620) of implementing an adaptive control system by combining the low-variance intelligent system and the low-bias intelligent system based on the estimated prediction error baseline.

According to various embodiments, after the step (step 620) of implementing an adaptive control system, the method may include the step of controlling the combination ratio of the low-variance intelligent system and the low-bias intelligent system, based on the prediction error baseline.

According to various embodiments, the prediction error baseline may vary in response to environment changes.

According to various embodiments, the prediction error baseline may represent a minimum value within a prediction error range which is achieved by the combination of the low-variance intelligent system and the low-bias intelligent system.

According to various embodiments, the low-variance intelligent system may include a model-free (MF) reinforcement learning algorithm, and the low-bias intelligent system may include a model-based (MB) reinforcement learning algorithm.

According to various embodiments, the first prediction error may be a reward prediction error (PRE), and the second prediction error may be a state prediction error (SPE).

According to various embodiments, the method may be repeatedly performed according to changes in the environment.

According to various embodiments, the electronic device 10 may include a memory 130 and a processor 140 connected to the memory 130 and configured to execute at least one instruction stored in the memory 130.

According to various embodiments, the processor 140 may be configured to estimate a prediction error baseline for an environment, based on a first prediction error of a low-variance intelligent system for the environment and a second prediction error of a low-bias intelligent system for the environment, and implement an adaptive control system by combining the low-variance intelligent system and the low-bias intelligent system based on the estimated prediction error baseline.

According to various embodiments, the processor 140 may be configured to control the combination ratio of the low-variance intelligent system and the low-bias intelligent system, based on the prediction error baseline.

According to various embodiments, the prediction error baseline may vary in response to environment changes.

According to various embodiments, the prediction error baseline may represent a minimum value within a prediction error range which is achieved by the combination of the low-variance intelligent system and the low-bias intelligent system.

According to various embodiments, the low-variance intelligent system may include a model-free (MF) reinforcement learning algorithm, and the low-bias intelligent system may include a model-based (MB) reinforcement learning algorithm.

According to various embodiments, the first prediction error may be a reward prediction error (PRE), and the second prediction error may be a state prediction error (SPE).

The aforementioned apparatus may be implemented in the form of a hardware component, a software component, and/or a combination of a hardware component and a software component. For example, the system and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. A processor may run an operating system (OS) and one or more software applications executed on the OS. Furthermore, the processor may access, store, manipulate, process, and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction, or a combination of one or more of these and may configure a processor so that it operates as desired or may instruct the processor independently or collectively. The software and/or data may be embodied in a machine, component, physical device, virtual equipment, or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to various embodiments may be implemented in the form of a program instruction executable by various computer means and stored in a computer-readable recording medium. The medium may continuously store a computer readable program, or temporarily store the computer readable program for execution or downloading. Further, the medium may be a variety of recording means or storage means in the form of a single hardware or a combination of a plurality of hardware, but is not limited to a medium directly connected to any computer system, but may be distributed on a network. Examples of the medium include a magnetic medium such as a hard disk, a floppy disk and a magnetic tape, an optical recording medium such as CD-ROM and DVD, a magneto-optical medium such as a floptical disk, ROM, RAM, flash memory, and the like such that program instructions are configured to be stored. Other examples of the medium may include a recording medium or a storage medium that is managed by an application store that distributes applications or a site, a server, etc. that supply or distribute various other software.

The various embodiments and the terms used herein are not intended to limit the technical features disclosed herein to specific embodiments and should be understood to include various modifications, equivalents, or alternatives of the corresponding embodiments. In describing the drawings, similar reference numerals may be used to designate similar or relevant constituent elements. The singular form of a noun corresponding to an item may include one or more items, unless the context clearly indicates otherwise. Herein, phrases such as "A or B," "at least one of A and B," "at least one of A or B," "A, B, or C," "at least one of A, B, and C," and "at least one of A, B, or C" may include any one or all possible combinations of items listed in the phrases. Terms such as "first" and "second" may simply be used to distinguish corresponding elements from the other elements, and the corresponding elements are not limited in other respects (e.g., importance or order). When a certain (e.g., first) element is referred to as being "coupled" or "connected" to another (e.g., second) element, with or without a term "functionally" or "communicatively," it means that the certain element can be connected to the other element directly (e.g., third), wirelessly, or via a third element.

The term "module" used herein may include a unit implemented in hardware, software, or firmware and may be used interchangeably with, for example, terms such as logic, logic block, component, or circuit. The "module" may be an integrated component, a minimum unit for performing one or more functions, or a part thereof. For example, according to an embodiment, the "module" may be implemented in the form of an application-specific integrated circuit (ASIC).

According to various embodiments, each of the above-described elements (e.g., modules or programs) may include one or more entities. According to various embodiments, one or more of the above-described elements or operations may be omitted, or one or more other elements or operations may be added. Alternatively or additionally, a plurality of elements (e.g., modules or programs) may be integrated into one element. In such a case, the integrated element may perform one or more functions of each of the plurality of elements in the same or similar manner as being performed by the corresponding one among the plurality of elements prior to the integration. According to various embodiments, operations performed by a module, a program, or other elements may be executed sequentially, in parallel, repeatedly, or heuristically. One or more of the operations may be omitted or executed in different orders. Alternatively, one or more other operations may be added.

The invention claimed is:

1. A method of operating an electronic device, the method comprising:
    accessing one or more programs stored on a non-transitory computer-readable storage medium to estimate a prediction error baseline (PE baseline) for an environment, based on a first prediction error of a low-variance intelligent system for the environment and a second prediction error of a low-bias intelligent system for the environment, wherein the prediction error baseline represents a minimum value within a prediction error range which is achieved by the combination of the low-variance intelligent system and the low-bias intelligent system, and wherein the prediction error baseline varies in response to environment changes; and
    implementing an adaptive control system by combining the low-variance intelligent system and the low-bias intelligent system based on the estimated prediction error baseline.

2. The method of claim 1, wherein the implementing of an adaptive control system comprises controlling the combination ratio of the low-variance intelligent system and the low-bias intelligent system, based on the prediction error baseline.

3. The method of claim 1, wherein the low-variance intelligent system comprises a model-free (MF) reinforcement learning algorithm, and the low-bias intelligent system comprises a model-based (MB) reinforcement learning algorithm.

4. The method of claim 1, wherein the first prediction error is a reward prediction error (PRE), and the second prediction error is a state prediction error (SPE).

5. The method of claim 1, wherein the method is repeatedly performed according to changes in the environment.

6. An electronic device comprising:
    a memory comprising a non-transitory computer-readable storage medium; and
    a processor connected to the memory and configured to execute at least one instruction stored in the memory, wherein the processor is configured to estimate a prediction error baseline for an environment, based on a first prediction error of a low-variance intelligent system for the environment and a second prediction error of a low-bias intelligent system for the environment, and implement an adaptive control system by combining the low-variance intelligent system and the low-bias intelligent system based on the estimated prediction error baseline, wherein the prediction error baseline represents a minimum value within a prediction error range which is achieved by the combination of the low-variance intelligent system and the low-bias intelligent system, and wherein the prediction error baseline varies in response to environment changes.

7. The electronic device of claim 6, wherein the processor is configured to control the combination ratio of the low-variance intelligent system and the low-bias intelligent system, based on the prediction error baseline.

8. The electronic device of claim 6, wherein the low-variance intelligent system comprises a model-free (MF) reinforcement learning algorithm, and the low-bias intelligent system comprises a model-based (MB) reinforcement learning algorithm.

9. The electronic device of claim 6, wherein the first prediction error is a reward prediction error (PRE), and the second prediction error is a state prediction error (SPE).

10. A non-transitory computer-readable storage medium for storing one or more programs to execute a method comprising:
estimating a prediction error baseline for an environment, based on a first prediction error of a low-variance intelligent system for the environment and a second prediction error of a low-bias intelligent system for the environment, wherein the prediction error baseline represents a minimum value within a prediction error range which is achieved by the combination of the low-variance intelligent system and the low-bias intelligent system, and wherein the prediction error baseline varies in response to environment changes; and
implementing an adaptive control system by combining the low-variance intelligent system and the low-bias intelligent system based on the estimated prediction error baseline.

11. The non-transitory computer-readable storage medium of claim 10, wherein the implementing of an adaptive control system comprises controlling the combination ratio of the low-variance intelligent system and the low-bias intelligent system, based on the prediction error baseline.

12. The non-transitory computer-readable storage medium of claim 10, wherein the low-variance intelligent system comprises a model-free (MF) reinforcement learning algorithm, and the low-bias intelligent system comprises a model-based (MB) reinforcement learning algorithm.

13. The non-transitory computer-readable storage medium of claim 10, wherein the first prediction error is a reward prediction error (PRE), and the second prediction error is a state prediction error (SPE).

14. The non-transitory computer-readable storage medium of claim 10, wherein the method is repeatedly performed according to changes in the environment.

* * * * *